United States Patent
Rocher et al.

(10) Patent No.: US 10,364,766 B2
(45) Date of Patent: Jul. 30, 2019

(54) METHOD FOR DETECTING AN INCLINATION OF A WHEEL RELATIVE TO THE HORIZONTAL

(71) Applicants: CONTINENTAL AUTOMOTIVE FRANCE, Toulouse (FR); CONTINENTAL AUTOMOTIVE GMBH, Hannover (DE)

(72) Inventors: Jacques Rocher, Saint-Orens-de-Gameville (FR); Nicolas Guinart, Toulouse (FR); Pierre-Emmanuel Maire, Roquettes (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 87 days.

(21) Appl. No.: 15/549,673

(22) PCT Filed: Jan. 28, 2016

(86) PCT No.: PCT/EP2016/000146
§ 371 (c)(1),
(2) Date: Aug. 9, 2017

(87) PCT Pub. No.: WO2016/128114
PCT Pub. Date: Aug. 18, 2016

(65) Prior Publication Data
US 2018/0030910 A1 Feb. 1, 2018

(30) Foreign Application Priority Data
Feb. 11, 2015 (FR) ...................................... 15 51127

(51) Int. Cl.
*B60T 8/17* (2006.01)
*G01C 9/00* (2006.01)
(Continued)

(52) U.S. Cl.
CPC .......... *F02D 41/021* (2013.01); *B60C 23/006* (2013.01); *B60C 23/0488* (2013.01);
(Continued)

(58) Field of Classification Search
CPC .. G01C 9/00; B60G 2400/10; B60G 2400/30; B60G 2400/52; B60G 2800/0124;
(Continued)

(56) References Cited

U.S. PATENT DOCUMENTS 6,438,464 B1 8/2002 Woywod et al.
8,352,122 B2 * 1/2013 Hasegawa .............. B62K 25/04
280/755

(Continued)

FOREIGN PATENT DOCUMENTS

CN 101 032 988 A 9/2007
CN 101288811 A 10/2008
(Continued)

OTHER PUBLICATIONS

Memsic-Ricardo Dao: "Inclination Sensing With Thermal Accelerometers", #AN-00MX-007 Application Note Rev A 05/02, Mar. 21, 2002 (Mar. 21, 2002), XP002297694, Retrieved from the Internet <URL: www.memsic.com/memsic/products/productsselector.asp> [retrieved on Mar. 21, 2002].
(Continued)

*Primary Examiner* — Nicholas Kiswanto
(74) *Attorney, Agent, or Firm* — Young & Thompson

(57) ABSTRACT

Disclosed is a method for detecting an inclination, relative to the ground, of a wheel of a motor vehicle which includes:
—measuring two accelerations by using two accelerometers
(Continued)

Figure 1:
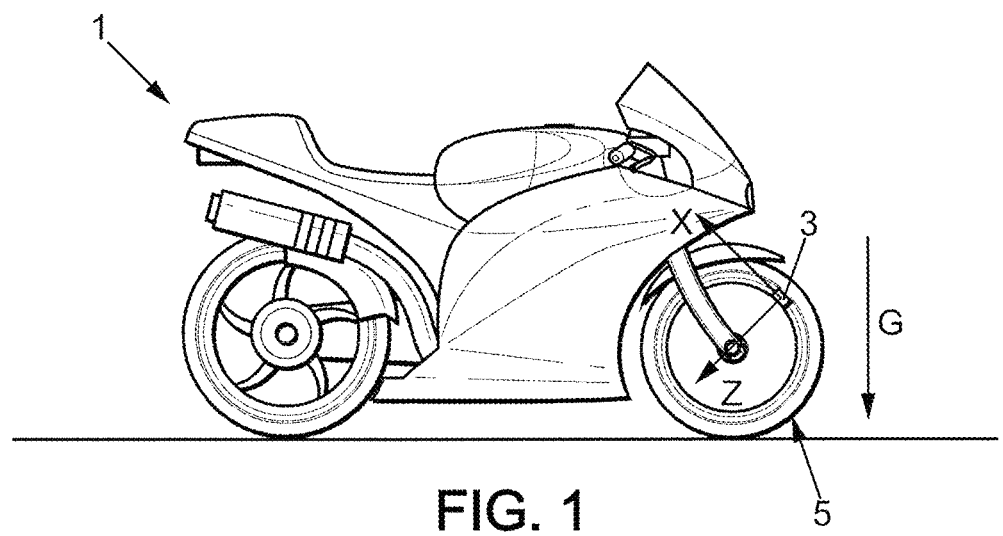

mounted on the wheel and suitable for measuring the acceleration of the wheel along a first axis and along a second axis, respectively, the first axis and the second axis being in the plane of the wheel and orthogonal, and —calculating the components of a gravity vector in a reference frame formed by the first axis and the second axis from the measurements of acceleration, —determining a modulus of the gravity vector from the calculated components, and —determining a position of inclination of the wheel relative to the ground by comparing the value of the modulus of the gravity vector with a predetermined value.

20 Claims, 2 Drawing Sheets

(51) Int. Cl.
    *B60C 23/00* (2006.01)
    *B60C 23/04* (2006.01)
    *F02D 41/02* (2006.01)
    *F02D 41/04* (2006.01)
    *B60G 17/016* (2006.01)
    *B60R 21/013* (2006.01)

(52) U.S. Cl.
    CPC ........ *B60G 17/0162* (2013.01); *B60T 8/1706* (2013.01); *F02D 41/042* (2013.01); *G01C 9/00* (2013.01); *B60G 2400/0511* (2013.01); *B60G 2400/10* (2013.01); *B60G 2400/30* (2013.01); *B60G 2400/52* (2013.01); *B60G 2800/0124* (2013.01); *B60R 21/013* (2013.01); *B60T 2230/03* (2013.01)

(58) Field of Classification Search
    CPC .............. B60G 17/0162; B60C 23/006; B60C 23/0488; B60T 8/1706; B60T 2230/03; B60R 21/013; F02D 41/021; F02D 41/042

See application file for complete search history.

(56) References Cited

U.S. PATENT DOCUMENTS

| | | |
|---|---|---|
| 2004/0050609 A1 | 3/2004 | Machida et al. |
| 2004/0194327 A1 | 10/2004 | Bryan |
| 2004/0256170 A1 | 12/2004 | Gaudiano |
| 2006/0176162 A1 | 8/2006 | Miekley et al. |
| 2007/0222575 A1 | 9/2007 | Kawashima |
| 2012/0116607 A1 | 5/2012 | Guinart |
| 2013/0179113 A1 | 7/2013 | Guinart |
| 2013/0227848 A1 | 9/2013 | Wilds et al. |
| 2013/0261925 A1 | 10/2013 | Kobayashi et al. |
| 2015/0221144 A1 | 8/2015 | Kourtev et al. |

FOREIGN PATENT DOCUMENTS

| | | |
|---|---|---|
| CN | 203502236 U | 3/2014 |
| CN | 103153656 B | 12/2015 |
| DE | 102 005 002 239 A1 | 7/2006 |
| DE | 102 009 046 226 A1 | 5/2011 |
| DE | 102 013 205 320 A1 | 10/2013 |
| DE | 102 013 102 575 B3 | 4/2014 |
| DE | 102 012 2222 965 A1 | 6/2014 |
| EP | 1 184 233 A1 | 3/2002 |
| EP | 1 304 544 A2 | 4/2003 |
| EP | 1 717 091 A1 | 11/2006 |
| EP | 1 985 824 A2 | 10/2008 |
| IT | TO20030584 A1 | 2/2004 |
| KR | 100 892 830 B1 | 4/2009 |
| KR | 2012/003823 A | 4/2012 |
| KR | 2013/0130980 A | 12/2013 |
| WO | 0 003 887 A1 | 1/2000 |
| WO | 2013/063641 A1 | 5/2013 |
| WO | 2013182258 A1 | 12/2013 |
| WO | 20130182258 A1 | 12/2013 |

OTHER PUBLICATIONS

International Search Report, dated May 3, 2016, from corresponding PCT/EP2016/000146 application.

* cited by examiner

METHOD FOR DETECTING AN INCLINATION OF A WHEEL RELATIVE TO THE HORIZONTAL

The present invention relates to a method for detecting an inclination, relative to the ground considered as a horizontal plane defined as being perpendicular to the direction of the gravity vector defining the vertical, of a wheel of a motor vehicle. It also relates to a method for managing an engine when the motor vehicle is in an abnormal operation mode, for example following an accident or a fortuitous event that can cause damage.

The invention is used in the field of motor vehicles and in particular of motorcycles.

A motor vehicle comprises several safety systems for preventing accidents and also for protecting the passengers of the vehicle and the vehicle itself in the event of an accident. Current trends aim to improve these safety systems from an effectiveness, reliability and cost-effectiveness perspective.

A tilt sensor is used as a safety system on board the motor vehicle in order to determine the inclination of said vehicle and thus to detect a possible accident. Indeed, the tilt sensor makes it possible to determine whether the vehicle is no longer in a so-called normal position but rather in a so-called lying position where the vehicle is parallel to the ground considered as a horizontal plane defined as being perpendicular to the direction of the gravity vector defining the vertical.

The most common tilt sensor in motor vehicles is an electromechanical system such as a tilt switch, also commonly called a crash switch. Such a tilt switch is a simple device, the open/closed state of which depends on the inclination thereof. This switch contains, for example, a drop of mercury free to move inside a cylindrical tube. When the drop of mercury is at one end, it closes an electrical contact and the current flows. On the contrary, when it is at the opposite end, the electrical contact is open and the current no longer flows. The tilt switch can also comprise a metal ball instead of the mercury drop. In addition, a simple accelerometer can be used as a tilt switch.

In motor vehicles, the tilt switch has a closed position if the vehicle is in the normal position and an open position if the vehicle is in the lying position.

For the latter case, the information transmitted by the tilt sensor enables a computer to stop the engine of the motor vehicle, for example by turning off the fuel pump of said vehicle or the injection of fuel into the combustion chamber of said vehicle.

The tilt switch effectively performs the initial function thereof of turning off the engine of the vehicle when said vehicle is lying as a result of an accident. However, the tilt switch may remain stuck, i.e. it remains in an open position while the vehicle is lifted upright again and is in the normal position thereof. If the tilt switch remains stuck in the open position, it is then impossible to restart the vehicle engine without the intervention of an operator to unlock the tilt switch.

This disadvantage is particularly annoying in low-speed accident situations where the passengers are not injured and the vehicles are not damaged and could leave quickly without passing via a maintenance service.

The aim of the invention is to eliminate, or at least alleviate, all or some of the aforementioned disadvantages of the prior art.

The aim of the present invention is then to propose a method for detecting a lying position of a vehicle in the event of an accident and thus to propose a safety system that is reliable.

Moreover, the present invention will make it possible to reduce the costs of manufacturing and installing such a safety system and also to reduce the spatial requirement of this system in the vehicle while guaranteeing the proper operation thereof.

Another aim of the present invention is to propose a method for managing an engine which, when an accident situation in which the vehicle is in a lying position is detected, makes it possible to stop the engine of the vehicle for safety.

Such a method according to the present invention also aims to enable the stopped engine to restart and re-operate normally when the accident situation is over, without any need for maintenance.

The associated safety system according to the invention will also preferably be easy to regulate and/or be highly effective and/or have a moderate cost price.

To this end, the present invention proposes a method for detecting an inclination of a wheel of a motor vehicle, relative to the ground considered as a horizontal plane defined as being perpendicular to the direction of the gravity vector defining the vertical. According to the present invention, said detecting method includes the following steps:

measuring two accelerations by using two accelerometers mounted on the wheel and suitable for measuring the acceleration at a point of said wheel along a first axis and along a second axis, respectively, the first axis and the second axis being in the plane of said wheel and orthogonal, and calculating the components of a gravity vector in a reference frame formed by the first axis and the second axis from the measurements of accelerations, determining the modulus of the gravity vector from the calculated components, and determining a position of inclination of the wheel relative to the ground considered as a horizontal plane defined as being perpendicular to the direction of the gravity vector defining the vertical, by comparing the value of the modulus of the gravity vector with a predetermined value.

Tests have shown that such a detecting method makes it possible to simply and quickly detect accident situations where the motor vehicle is in a position parallel to the ground, the latter being considered as a horizontal plane defined as being perpendicular to the direction of the gravity vector defining the vertical, called the lying position, in a reliable and effective manner. Indeed, the use of two accelerometers makes it possible to avoid the use of a tilt switch.

The use of two accelerometers makes it possible to reconstruct the gravity vector by determining, in the measured accelerations, the part of the acceleration measured due to gravity, knowing that gravity influences the acceleration measurements by "adding" a signal that varies sinusoidally. The measured gravity vector should then be compared with a predetermined value in order to facilitate the detection of a lying position of a vehicle. Indeed, when the wheel is vertical, the amplitude of the part of the signal measured by each accelerometer due to gravity is maximal and it becomes zero for a wheel that is horizontal since the measurement axes of each accelerometer are in the plane of the wheel.

Moreover, the use of two accelerometers associated with a wheel of the vehicle makes it possible to simply detect a driving situation of said vehicle and also to locate the wheel in question.

Advantageously, the first axis has a direction tangential to the wheel with which it is associated and the second axis has a direction centripetal to said wheel. Considering the centripetal vector and the tangential vector of the wheel in question makes it possible to facilitate the calculation of the modulus of the gravity vector.

For the purpose of optimization, the two accelerometers are those of a tire pressure automatic checking system, called a TPMS (Tire Pressure Monitoring System). Reusing two accelerometers already on board a vehicle advantageously makes it possible to reduce the spatial requirement and the costs of such a safety system.

The present invention also relates to a method for managing an engine of a motor vehicle comprising at least two wheels when the vehicle is in an abnormal operation mode following an accident corresponding to a fortuitous event that can cause damage. The managing method includes the following steps:
- detecting a transition between a movement phase and a stop phase of the vehicle,
- determining a level of inclination, relative to the ground considered as a horizontal plane defined as being perpendicular to the direction of the gravity vector defining the vertical, of at least one wheel of the vehicle according to the detecting method described above,
- determining an overall inclination position of the vehicle relative to the ground considered as a horizontal plane defined as being perpendicular to the direction of the gravity vector defining the vertical, depending on the measurement of the level of inclination of each wheel in question,
- stopping the engine of the vehicle, if the vehicle has a position substantially parallel to the ground considered as a horizontal plane defined as being perpendicular to the direction of the gravity vector defining the vertical, corresponding to the abnormal operation mode.

Such a method for managing an engine makes it possible to effectively detect a possible accident situation in which the vehicle is in a lying position and to quickly stop the engine of the vehicle for safety reasons. Furthermore, the use of two accelerometers at each wheel makes it possible to simply and quickly detect both the movement of the vehicle and the overall inclination of said vehicle.

In one embodiment, a time interval between two measurements of the level of inclination increases when the vehicle speed increases. Regulating the time interval between two measurements of the level of inclination makes it possible to reduce the energy consumption of the accelerometers and thus prolong the autonomy thereof.

An advantageous embodiment proposes, in this case, that the managing method further comprise a step of transmitting the measurement of the level of inclination to a computing unit via radio frequency communication. Having a radio frequency transmission makes it possible to transmit measurements made by the accelerometers reliably and to increase the speed of transmission. Moreover, centralizing the measurements of the various wheels in question to a computing unit also makes it possible to render the managing method more reliable by considering the vehicle in the environment thereof.

Such a managing method further includes the following steps:
- detecting a transition between a movement phase and a stop phase of the vehicle,
- determining a level of inclination, relative to the ground considered as a horizontal plane defined as being perpendicular to the direction of the gravity vector defining the vertical, of at least one wheel of the vehicle according to the detecting method described above,
- determining an overall inclination position of the vehicle relative to the ground considered as a horizontal plane defined as being perpendicular to the direction of the gravity vector defining the vertical, depending on the measurement of the level of inclination of each wheel in question,
- when the vehicle is in the abnormal operation mode:
- transmitting a command to unlock a vehicle start prevention, if the vehicle no longer has a position substantially parallel to the ground considered as a horizontal plane defined as being perpendicular to the direction of the gravity vector defining the vertical, corresponding to the abnormal operation mode.

Thus, there is no locking of the engine in a stop state. This therefore makes it possible, particularly in the event of a low-speed accident where there is no injury or damage to the vehicle, to restart the engine normally when a user of the vehicle commands starting.

Furthermore, the time interval between two measurements of the level of inclination of a wheel when the vehicle is in the abnormal operation mode is less than that of a wheel when the vehicle is in the stop phase. Reducing the time interval between two measurements of the inclination of the vehicle, following the detection of an abnormal operation mode corresponding to an accident situation, makes it possible to quickly restart the engine of the vehicle once the accident situation is over.

Advantageously, the level of inclination of each wheel of the vehicle is measured and taken into account for determining the overall inclination position of the vehicle. Considering all the wheels of the vehicle in order to detect the inclination of the vehicle makes it possible to increase the reliability of such a managing method.

The present invention also relates to an electronic module for detecting an inclination, relative to the ground considered as a horizontal plane defined as being perpendicular to the direction of the gravity vector defining the vertical, of a wheel of a motor vehicle. This electronic detection module includes means for carrying out each of the steps of the detecting method described above.

Finally, the present invention also relates to an electronic module for managing an engine of a motor vehicle. This electronic management module includes means for carrying out each of the steps of the managing method described above.

Figure 2:
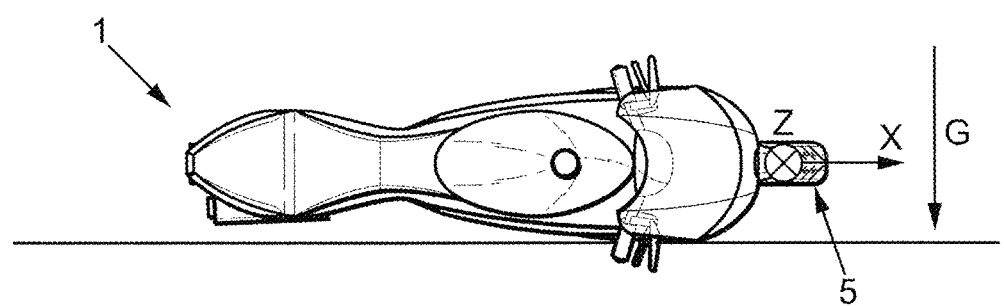
Figure 3:
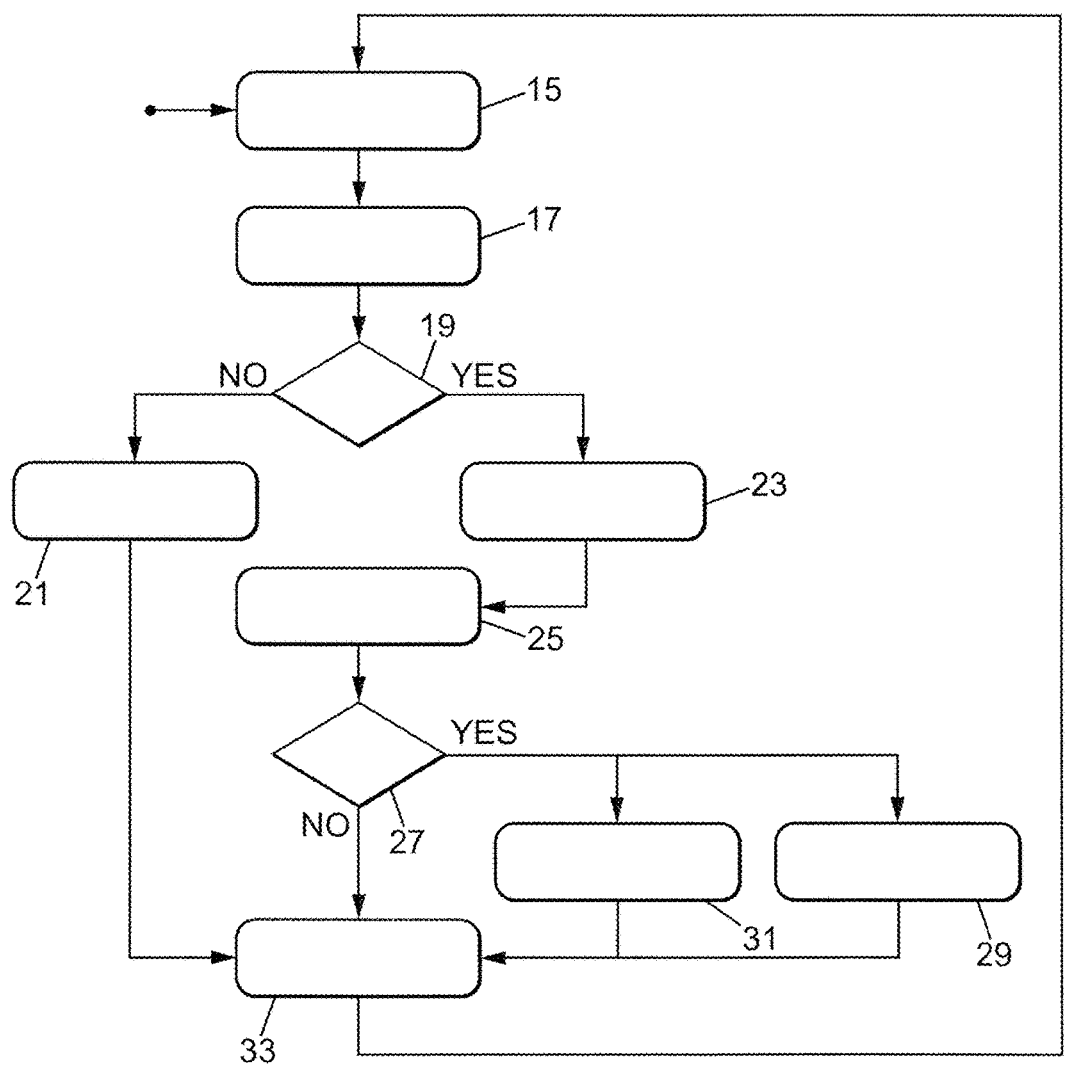

Details and advantages of the present invention will appear more clearly on reading the following description, with reference to the appended diagrammatic drawings, in which:

FIG. 1 is a diagram of a motorcycle seen in profile according to one embodiment, FIG. 2 is a diagram of a motorcycle seen from above according to the previous embodiment, and FIG. 3 is a flow diagram of a method for managing an engine according to one embodiment.

In the following description, the present invention is illustrated in a use of a motorcycle.

FIG. 1 and FIG. 2 illustrate a general diagram of a motorcycle 1 having an inclination detection system 3 shown on a front wheel 5. In addition, FIG. 1 shows the motorcycle 1 in a normal position according to one embodiment and FIG. 2 shows said motorcycle 1 in a lying position according to the same embodiment.

The normal position of the motorcycle 1 corresponds to an upright position of the motorcycle 1 in which said motorcycle 1 can drive normally. On the contrary, the lying position of the motorcycle 1 corresponds to a position parallel to the ground which is considered as a horizontal plane defined as being perpendicular to the direction of the gravity vector defining the vertical. The motorcycle 1 is in the lying position, generally, following an accident associated with a fortuitous event that can cause damage to said motorcycle 1 and to the passenger(s). Thus, when the motorcycle 1 is in a lying position following an accident, it is in an abnormal operation mode, unlike a normal operation mode in which the motorcycle 1 is in the driving phase or in the parking phase.

In this embodiment, the front wheel 5 comprises two accelerometers. A first accelerometer measures the acceleration of the front wheel 5 along a first axis x and a second accelerometer measures the acceleration of the same front wheel 5 along a second axis z. The first axis x and the second axis z are orthogonal and the respective directions thereof lie in the plane of the wheel. Therefore, they form a reference frame.

The two accelerometers are both integrated on a same supporting means in an electronic box mounted on the front wheel 5. They are, preferably, rigidly connected to the wheel so that the two axes form a rotating reference frame. Thus, the accelerometers can be fixed on a valve of the wheel or glued to the inside of the wheel on the tire or hooped on the wheel rim or at any place where the air pressure of the tire of the wheel can be measured.

Still in the exemplary embodiment of FIGS. 1 and 2, the first axis x has a direction tangential to the wheel with which it is associated, i.e. it is perpendicular to the radius of said front wheel 5, and the second axis z has a centripetal direction, i.e. it has the same direction as a radius of the front wheel 5.

The acceleration x" measured along the first axis x corresponding to the tangential acceleration is broken down as indicated by the relation 7 and the acceleration z" measured along the second axis z is broken down as indicated by the relation 9. $G_x$ and $G_z$ are the components of a gravity G vector along the first axis x and the second axis z, respectively, r is the distance separating the accelerometer from the center of the wheel and w is the speed of rotation of the wheel. The component $G_x$ is shifted by +/−90° with respect to the component $G_z$ of the gravity G vector depending on the direction of rotation of the front wheel 5 since the two axes x and z are orthogonal.

$$x''=G_x \quad (7)$$

$$z''=r\omega^2+G_z \quad (9)$$

In the example of FIG. 1, it is then possible to calculate that the modulus of the gravity G vector is equal to:

$$\sqrt{|G_z|^2+|G_x|^2}=|G|=1 \text{ g} \quad (11)$$

Thus, since the modulus of the gravity G vector is equal to 1 g corresponding to approximately 9.80665 m·s⁻², then the front wheel 5 is upright in a normal position.

On the contrary, in the example of FIG. 2, it is possible to calculate that the modulus of the gravity G vector is equal to:

$$|G_z|=|G_x|=0 \text{ g} \quad (13)$$

Indeed, in this example, the gravity G vector is perpendicular to the plane of the first axis x and of the second axis z. Thus, the respective amplitudes of the two components $G_z$ and $G_x$ thereof projected on the planes of the vectors are zero. Thus, the front wheel 5 is in a lying position.

A computing unit (not shown in the figures) is mounted on board the motorcycle 1 and allows the implementation of a method for detecting an inclination, relative to the ground considered as a horizontal plane defined as being perpendicular to the direction of the gravity vector defining the vertical, of the front wheel 5 of the motorcycle 1.

In the exemplary embodiment of FIGS. 1 and 2, the detecting method includes the following steps:
  measuring the acceleration x", z" of the front wheel 5 along the first axis x and the second axis z, and
  calculating the components $G_x$, $G_z$ of the gravity G vector in the reference frame formed by the first axis x and the second axis z from the measurements of acceleration x", z" and using the relations 7 and 9, the radius r and the rotational speed ω being known,
  determining a modulus of the gravity G vector from the calculated components $G_x$, $G_z$, and
  determining a position of inclination of the wheel relative to the ground considered as a horizontal plane defined as being perpendicular to the direction of the gravity vector defining the vertical, by comparing the value of the modulus of the gravity G vector with the value measured when the wheel is vertical $G_{max}$. This last value $G_{max}$ is theoretically g (=9.80665) but may be different depending on the settings and calibrations undertaken. The calculation of the ratio $G/G_{max}$ makes it possible to then determine the inclination of the wheel.

A value $G_{threshold}$ is also determined, from which it is considered that the wheel is lying and therefore in a position considered as abnormal. Of course, the predetermined value $G_{threshold}$ is preferably close to 0. Thus, if the modulus of the gravity G vector determined by the detecting method is greater than the predetermined value $G_{threshold}$, then the front wheel 5 is considered to be in a normal position. On the contrary, if this modulus is less than the predetermined value $G_{threshold}$, i.e. if it is equal to 0, then the front wheel 5 is in a lying position.

Recent motorcycles are generally equipped with a tire pressure automatic checking system, called a TPMS (Tire Pressure Monitoring System). Indeed, this TPMS is now mandatory, in Europe and also in the United States, on all new models of motor vehicles.

The TPMS is a system that enhances the safety of the vehicle by monitoring the tire pressure while taking into account the driving conditions of the vehicle. One type of TPMS is the direct TPMS which consists in detecting the pressure of each tire of the vehicle directly on the corresponding tire. The direct TPMS comprises various sensors positioned, directly, in the rim of the wheel and more precisely inside the air chamber.

In particular, a direct TPMS includes a pressure sensor and a temperature sensor. In addition, the direct TPMS comprises, on each wheel in question, a first accelerometer, the function of which is to detect the phases of movement of the vehicle in order to activate, or not, the TPMS and, generally, a second accelerometer for locating the wheel concerned in order to indicate to the user on which wheel there is a problem when it is detected.

In a preferred embodiment, the accelerometers of a direct TPMS are also used to detect the inclination of a wheel of the motorcycle 1. Indeed, rather than adding two accelerometers, the accelerometers of the direct TPMS can be used to detect the movement of the motorcycle 1, to locate the wheel in question among all the wheels of the motorcycle 1, and also to determine the inclination of the wheel in question. In this embodiment, the method for detecting an inclination, relative to the ground considered as a horizontal plane defined as being perpendicular to the direction of the gravity vector defining the vertical, of a wheel of a motor vehicle is the same as that previously described with reference to FIGS. 1 and 2. Thus, the inclination detection system 3 corresponds to the direct TPMS associated with the front wheel 5 of the motorcycle 1.

In an exemplary embodiment, the two associated accelerometers are each composed of a sensing element. These sensing elements are arranged on a same chip such as to form a single sensor.

The invention also relates to a method for managing an engine of a motorcycle 1. FIG. 3 illustrates an embodiment of this managing method.

The managing method includes a first step 15 for acquiring the accelerations x", z" along the first axis x and the second axis z, respectively, of the front wheel 5. The managing method then includes a step 17 for analyzing the data acquired during the acquiring step 15 in order to determine the speed of the motorcycle 1. This analyzing step 17 allows the detection 19 of a transition between a movement phase and a stop phase of the motorcycle 1.

In the case where the motorcycle 1 is in a movement phase, then the managing method awaits (waiting step 33) a new acquisition of the accelerations x", z" according to the acquiring step 15. Also, the managing method sets, in a first setting step 21, the periodicity of the acquiring step 15 at a high frequency. More precisely, the time interval between two acquisitions of the accelerations x", z" to detect a transition between a movement phase and a stop phase is preferably small compared with the time interval between two acquisitions of the accelerations x", z" in order to determine the position of the motorcycle. In particular, the periodicity of the acquiring step 15 increases when the speed of the motorcycle increases.

In the opposite case where the motorcycle 1 is in a stop phase, then the managing method sets, in a second setting step 23, the periodicity of the acquisition of the accelerations x", z" in order to measure a level of inclination of the wheel at a low frequency. The managing method then comprises a step 25 of measuring a level of inclination, relative to the ground considered as a horizontal plane defined as being perpendicular to the direction of the gravity vector defining the vertical, of the front wheel 5 according to the previously described detecting method. This measuring step 25 is repeated in parallel preferably for all the wheels in question. The managing method then comprises a step 27 for determining an overall inclination position of the motorcycle 1 relative to the ground considered as a horizontal plane defined as being perpendicular to the direction of the gravity vector defining the vertical, depending on the measurement of the level of inclination of each wheel in question. The determining step 27 determines whether the motorcycle is in the normal position or if it is in the lying position, and there can be no intermediate position.

In the case where the motorcycle is in a normal position, then the managing method awaits (waiting step 33) a new acquisition of the accelerations x", z" according to the acquiring step 15.

In the opposite case where the motorcycle is in a lying position, then the motorcycle is in the abnormal operation mode and the managing method comprises a stop command step 29 for the engine of the motorcycle. The stop command may, for example, consist in stalling the engine, for example by turning off the injection of fuel into the engine.

In parallel, the managing method comprises a third step 31 for setting the periodicity of the acquisition of the accelerations x", z" in order to measure a level of inclination of the wheel at a frequency greater than that where the motorcycle is in a stop phase and in a normal position but preferably less than that where the motorcycle is in a movement phase. Increasing this periodicity makes it possible to quickly restart the motorcycle when the accident did not cause material damage to the motorcycle. The vehicle then returns to the normal operation mode. The managing method then awaits (waiting step 33) a new acquisition of the accelerations x", z" according to the acquiring step 15.

Furthermore, the managing method has several steps for transmitting the information acquired by the accelerometers to a computing unit via radio frequency communication. The function of the computing unit is therefore to calculate the levels of inclination of each wheel, to centralize the various information and to determine the overall level of inclination of the motorcycle 1. In one embodiment, the computing unit is part of an injection computer. However, the computing unit could also be part of the cabin computer or be a computer specially dedicated to the detecting method and the managing method described above.

The present invention also relates to an electronic module for detecting the inclination of a wheel of a vehicle relative to the ground considered as a horizontal plane defined as being perpendicular to the direction of the gravity vector defining the vertical. The electronic detection module comprises means for carrying out each of the steps of the detecting method described above.

In addition, the present invention relates to an electronic module for managing the engine of a vehicle. The electronic management module includes means for carrying out each of the steps of the managing method described above.

In an alternative embodiment of the present invention, the first axis x and the second axis z are not orientated in the centripetal direction and the tangential direction. Indeed, these axes can be chosen in a random manner as long as they remain in the direction of the plane of the wheel and perpendicular to one another. The fact of choosing a centripetal axis and a tangential axis makes it possible to limit and simplify the calculations of the modulus of the vector representing the gravity G.

Furthermore, in another alternative embodiment, the managing method takes account of the inclination of all the wheels of the vehicle in order to determine the overall inclination of the vehicle for greater reliability. However, in the example where the vehicle is a car, the managing method could only take into account three wheels, for example.

The present invention thus makes it possible to determine, simply, reliably and quickly, the inclination of each of the wheels of a vehicle in order to determine whether the latter is in an abnormal operation mode.

The invention then makes it possible to put in place a safety system that is effective and inexpensive since it reuses sensors already present in the vehicle.

Moreover, the fact of using the modulus of the gravity vector compared with a predetermined value, combined with the fact that the vehicle has stopped, makes it possible to render the engine stop command safe by taking into account various situations in which the vehicle is considerably tilted without being in an accident situation, for example when a motorcycle undertakes a tight turn.

Moreover, combining the inclination measurements of several wheels of the vehicle makes it possible to detect situations of inconsistencies and to decide whether the engine needs to be turned off.

Setting the periodicity of the acceleration acquisitions makes it possible to increase the life of the sensors which are autonomous and operate using a battery while guaranteeing a sufficient level of safety.

The present invention makes it possible to remove the tilt sensor of the prior art. In an alternative embodiment, the present invention can, on the contrary, make it possible to bring about a redundancy of the information for detecting an inclination of the vehicle by linking the present invention with the tilt sensor of the prior art.

The present invention can be used in any type of motor vehicle such as motorcycles or cars.

Of course, the present invention is not limited to the preferred embodiment and to the alternative embodiments presented above as non-limiting examples. It also relates to the alternative embodiments within the capabilities of a person skilled in the art within the scope of the following claims.

The invention claimed is:

1. A method for detecting an inclination, relative to the ground considered as a horizontal plane defined as being perpendicular to the direction of the gravity vector defining the vertical, of a wheel of a motor vehicle, the method comprising:
    measuring two accelerations (x", z") by using two accelerometers mounted on the wheel and suitable for measuring the acceleration (x", z") at a point of said wheel along a first axis (x) and along a second axis (z), respectively, the first axis (x) and the second axis (z) being in the plane of said wheel and orthogonal, and
    calculating the components ($G_x$, $G_z$) of a gravity (G) vector in a reference frame formed by the first axis (x) and the second axis (z) from the measurements of accelerations (x", z"),
    determining the modulus of the gravity (G) vector from the calculated components ($G_x$, $G_z$), and
    determining a position of inclination of the wheel relative to the ground considered as a horizontal plane defined as being perpendicular to the direction of the gravity vector defining the vertical, by comparing the value of the modulus of the gravity (G) vector with a predetermined value ($G_{max}$).

2. The detecting method as claimed in claim 1, wherein the first axis (x) has a direction tangential to the wheel with which it is associated and the second axis (z) has a direction centripetal to said wheel.

3. The detecting method as claimed in claim 1, wherein the two accelerometers are those of a tire pressure automatic checking system, called a TPMS (Tire Pressure Monitoring System).

4. A method for managing an engine of a motor vehicle comprising at least two wheels when the vehicle is in an abnormal operation mode following an accident corresponding to a fortuitous event that can cause damage, further comprising:
    detecting a transition between a movement phase and a stop phase of the vehicle,
    determining a level of inclination, relative to the ground considered as a horizontal plane defined as being perpendicular to the direction of the gravity vector defining the vertical, of at least one wheel of the vehicle as claimed in claim 1,
    determining an overall inclination position of the vehicle relative to the ground considered as a horizontal plane defined as being perpendicular to the direction of the gravity vector defining the vertical, depending on the measurement of the level of inclination of each wheel in question,
    stopping the engine of the vehicle, if the vehicle has a position substantially parallel to the ground considered as a horizontal plane defined as being perpendicular to the direction of the gravity vector defining the vertical, corresponding to the abnormal operation mode.

5. The managing method as claimed in claim 4, wherein a time interval between two measurements of the level of inclination increases when the vehicle speed increases.

6. The managing method as claimed in claim 4, further comprising a step of transmitting the measurement of the level of inclination to a computing unit via radio frequency communication.

7. The managing method as claimed in claim 4, further comprising:
    detecting a transition between a movement phase and a stop phase of the vehicle,
    determining a level of inclination, relative to the ground considered as a horizontal plane defined as being perpendicular to the direction of the gravity vector defining the vertical, of at least one wheel of the motor vehicle,
    determining an overall inclination position of the vehicle relative to the ground considered as a horizontal plane defined as being perpendicular to the direction of the gravity vector defining the vertical, depending on the measurement of the level of inclination of each wheel in question,
    when the vehicle is in the abnormal operation mode:
    transmitting a command to unlock a vehicle start prevention, if the vehicle no longer has a position substantially parallel to the ground considered as a horizontal plane defined as being perpendicular to the direction of the gravity vector defining the vertical, corresponding to the abnormal operation mode.

8. The managing method as claimed in claim 4, wherein the time interval between two measurements of the level of inclination of a wheel when the vehicle is in the abnormal operation mode is less than that of a wheel when the vehicle is in the stop phase.

9. An electronic module for detecting an inclination, relative to the ground considered as a horizontal plane defined as being perpendicular to the direction of the gravity vector defining the vertical, of a wheel of a motor vehicle, further comprising means for carrying out each of the steps of a detecting method as claimed in claim 1.

10. An electronic module for managing an engine of a motor vehicle, further comprising means for carrying out each of the steps of a managing method as claimed in claim 4.

11. The detecting method as claimed in claim 2, wherein the two accelerometers are those of a tire pressure automatic checking system, called a TPMS (Tire Pressure Monitoring System).

12. A method for managing an engine of a motor vehicle comprising at least two wheels when the vehicle is in an abnormal operation mode following an accident corresponding to a fortuitous event that can cause damage, further comprising:

detecting a transition between a movement phase and a stop phase of the vehicle, determining a level of inclination, relative to the ground considered as a horizontal plane defined as being perpendicular to the direction of the gravity vector defining the vertical, of at least one wheel of the vehicle as claimed in claim 2, determining an overall inclination position of the vehicle relative to the ground considered as a horizontal plane defined as being perpendicular to the direction of the gravity vector defining the vertical, depending on the measurement of the level of inclination of each wheel in question, stopping the engine of the vehicle, if the vehicle has a position substantially parallel to the ground considered as a horizontal plane defined as being perpendicular to the direction of the gravity vector defining the vertical, corresponding to the abnormal operation mode.

13. A method for managing an engine of a motor vehicle comprising at least two wheels when the vehicle is in an abnormal operation mode following an accident corresponding to a fortuitous event that can cause damage, further comprising:

detecting a transition between a movement phase and a stop phase of the vehicle, determining a level of inclination, relative to the ground considered as a horizontal plane defined as being perpendicular to the direction of the gravity vector defining the vertical, of at least one wheel of the vehicle as claimed in claim 3, determining an overall inclination position of the vehicle relative to the ground considered as a horizontal plane defined as being perpendicular to the direction of the gravity vector defining the vertical, depending on the measurement of the level of inclination of each wheel in question, stopping the engine of the vehicle, if the vehicle has a position substantially parallel to the ground considered as a horizontal plane defined as being perpendicular to the direction of the gravity vector defining the vertical, corresponding to the abnormal operation mode.

14. The managing method as claimed in claim 5, further comprising a step of transmitting the measurement of the level of inclination to a computing unit via radio frequency communication.

15. The managing method as claimed in claim 5, wherein the time interval between two measurements of the level of inclination of a wheel when the vehicle is in the abnormal operation mode is less than that of a wheel when the vehicle is in the stop phase.

16. The managing method as claimed in claim 6, wherein the time interval between two measurements of the level of inclination of a wheel when the vehicle is in the abnormal operation mode is less than that of a wheel when the vehicle is in the stop phase.

17. The managing method as claimed in claim 7, wherein the time interval between two measurements of the level of inclination of a wheel when the vehicle is in the abnormal operation mode is less than that of a wheel when the vehicle is in the stop phase.

18. An electronic module for detecting an inclination, relative to the ground considered as a horizontal plane defined as being perpendicular to the direction of the gravity vector defining the vertical, of a wheel of a motor vehicle, further comprising means for carrying out each of the steps of a detecting method as claimed in claim 2.

19. An electronic module for detecting an inclination, relative to the ground considered as a horizontal plane defined as being perpendicular to the direction of the gravity vector defining the vertical, of a wheel of a motor vehicle, further comprising means for carrying out each of the steps of a detecting method as claimed in claim 3.

20. An electronic module for managing an engine of a motor vehicle, further comprising means for carrying out each of the steps of a managing method as claimed in claim 5.

* * * * *